US008054339B2

(12) United States Patent
Fossum et al.

(10) Patent No.: US 8,054,339 B2
(45) **Date of Patent: *Nov. 8, 2011**

(54) DIGITAL EXPOSURE CIRCUIT FOR AN IMAGE SENSOR

(75) Inventors: Eric R. Fossum, La Crescenta, CA (US); Alexander I. Krymski, Montrose, CA (US); Roger A. Panicacci, Los Angeles, CA (US); Christopher Clark, Pasadena, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,382

(22) Filed: Feb. 16, 2010

(65) Prior Publication Data

US 2010/0141789 A1 Jun. 10, 2010

Related U.S. Application Data

(63) Continuation of application No. 12/637,224, filed on Dec. 14, 2009, which is a continuation of application No. 11/121,956, filed on May 5, 2005, now Pat. No. 7,646,407, which is a continuation of application No. 09/298,306, filed on Apr. 23, 1999, now Pat. No. 6,906,745.

(60) Provisional application No. 60/082,793, filed on Apr. 23, 1998.

(51) Int. Cl.
*H04N 5/235* (2006.01)
*H04N 3/14* (2006.01)

(52) U.S. Cl. ...................... 348/229.1; 348/362; 348/297

(58) Field of Classification Search ............... 348/229.1, 348/362, 221.1, 296, 297; 358/443, 482
See application file for complete search history.

(56) References Cited

U.S. PATENT DOCUMENTS 4,684,995 A * 8/1987 Baumeister .................. 348/349
4,686,648 A 8/1987 Fossum
4,744,623 A 5/1988 Prucnal et al.
4,776,925 A 10/1988 Fossum et al.
4,920,069 A 4/1990 Fossum et al.
5,055,900 A 10/1991 Fossum et al.
5,079,622 A 1/1992 Toshinobu
5,080,214 A 1/1992 Fossum
5,194,960 A 3/1993 Ota
5,236,871 A 8/1993 Fossum et al.
5,386,128 A 1/1995 Fossum et al.
5,471,515 A 11/1995 Fossum et al.
5,504,524 A 4/1996 Lu et al.
5,512,950 A 4/1996 Watanabe et al.
5,548,773 A 8/1996 Kemeny et al.
5,638,123 A 6/1997 Yamaguchi
5,665,959 A 9/1997 Fossum et al.
5,710,954 A 1/1998 Inoue
5,793,322 A 8/1998 Fossum et al.
5,822,222 A * 10/1998 Kaplinsky et al. ......... 250/316.1

(Continued)

*Primary Examiner* — Nhan T Tran
(74) *Attorney, Agent, or Firm* — Lerner, David, Littenberg, Krumholz & Mentlik, LLP

(57) ABSTRACT

Automatic exposure adjusting device considers the image on a pixel-by-pixel basis. Each pixel is characterized according to its most significant bits. After the pixels are characterized, the number of pixels in any particular group is counted. That counting is compared with thresholds which set whether the image is over exposed, under exposed, and can optionally also determine if the image is seriously over exposed or seriously under exposed. Adjustment of the exposure is carried out to bring the image to a more desired state.

16 Claims, 6 Drawing Sheets

U.S. PATENT DOCUMENTS 5,841,126 A 11/1998 Fossum et al.
5,880,691 A 3/1999 Fossum et al.
5,886,659 A 3/1999 Pain et al.
5,887,049 A 3/1999 Fossum
5,909,026 A 6/1999 Zhou et al.
5,920,274 A 7/1999 Gowda et al.
5,949,483 A 9/1999 Fossum et al.
5,952,645 A 9/1999 Wang et al.
5,990,506 A 11/1999 Fossum et al.
5,995,163 A 11/1999 Fossum
6,005,619 A 12/1999 Fossum
6,008,486 A 12/1999 Stam et al.
6,021,172 A 2/2000 Fossum et al.
6,040,860 A 3/2000 Tamura et al.
6,057,539 A 5/2000 Zhou et al.
6,061,091 A * 5/2000 Van de Poel et al. ......... 348/364
6,124,891 A 9/2000 Homma et al.
6,141,047 A 10/2000 Kawai et al.
6,282,462 B1 8/2001 Hopkins
6,486,503 B1 11/2002 Fossum
6,816,200 B1 11/2004 Gough
6,906,745 B1 * 6/2005 Fossum et al. ............. 348/229.1
7,646,407 B2 * 1/2010 Fossum et al. ................ 348/362
2010/0134653 A1 * 6/2010 Fossum et al. ............. 348/229.1

* cited by examiner

DIGITAL EXPOSURE CIRCUIT FOR AN IMAGE SENSOR

CROSS REFERENCE TO RELATED APPLICATIONS

This application is a continuation of U.S. application Ser. No. 12/637,224, filed Dec. 14, 2009, which is a continuation of U.S. application Ser. No. 11/121,956, filed May 5, 2005 and issued as U.S. Pat. No. 7,646,407, which is a continuation of U.S. application Ser. No. 09/298,306, filed Apr. 23, 1999 and issued as U.S. Pat. No. 6,906,745, which claims the benefit of the U.S. Provisional Application No. 60/082,793, filed on Apr. 23, 1998, the entire disclosures of which are incorporated herein by reference.

BACKGROUND OF THE INVENTION

CMOS active pixel sensors represent a digital solution to obtaining an image of an impinging scene. CMOS technology enables integrating electronics associated with the image sensing onto the chip. This includes, for example, one or more analog-to-digital converters on the chip, as well as timing and control circuitry.

One important feature of a well-defined image is an amount exposure. Some cameras include automatic gain and exposure control. The automatic gain and exposure control determines if the image is underexposed or overexposed, and can adjust some feature of the image acquisition to correct the exposure amount.

Existing CCD cameras select the exposure time based on some feature of the scene being imaged. Some cameras, for example, compute the average intensity over the entire pixel array. Other cameras compute the average intensity over a central area of the CCD. The average is often calculated by a digital signal processor which is separate from the CCD chip.

SUMMARY OF THE INVENTION

The present system teaches a programmable threshold indicator based on accumulated and programmable measurements of image pieces. The digital image data stream is analyzed by the counting the number of samples within a given interval of intensities to form information indicating an image histogram. The sample count is compared with programmable thresholds.

DESCRIPTION OF THE PREFERRED EMBODIMENTS

The inventors recognize that in some particular images, exposure control by simply computing the average of the image could produce disadvantageous results. For example, consider a scene of black and white stripes. Fifty percent of the image could be very bright, and the other fifty percent could be completely dark. The average is fifty percent which could be considered the correct exposure. Both image portions from the bright scene and the dark scene, however, could be poor.

Figure 1:
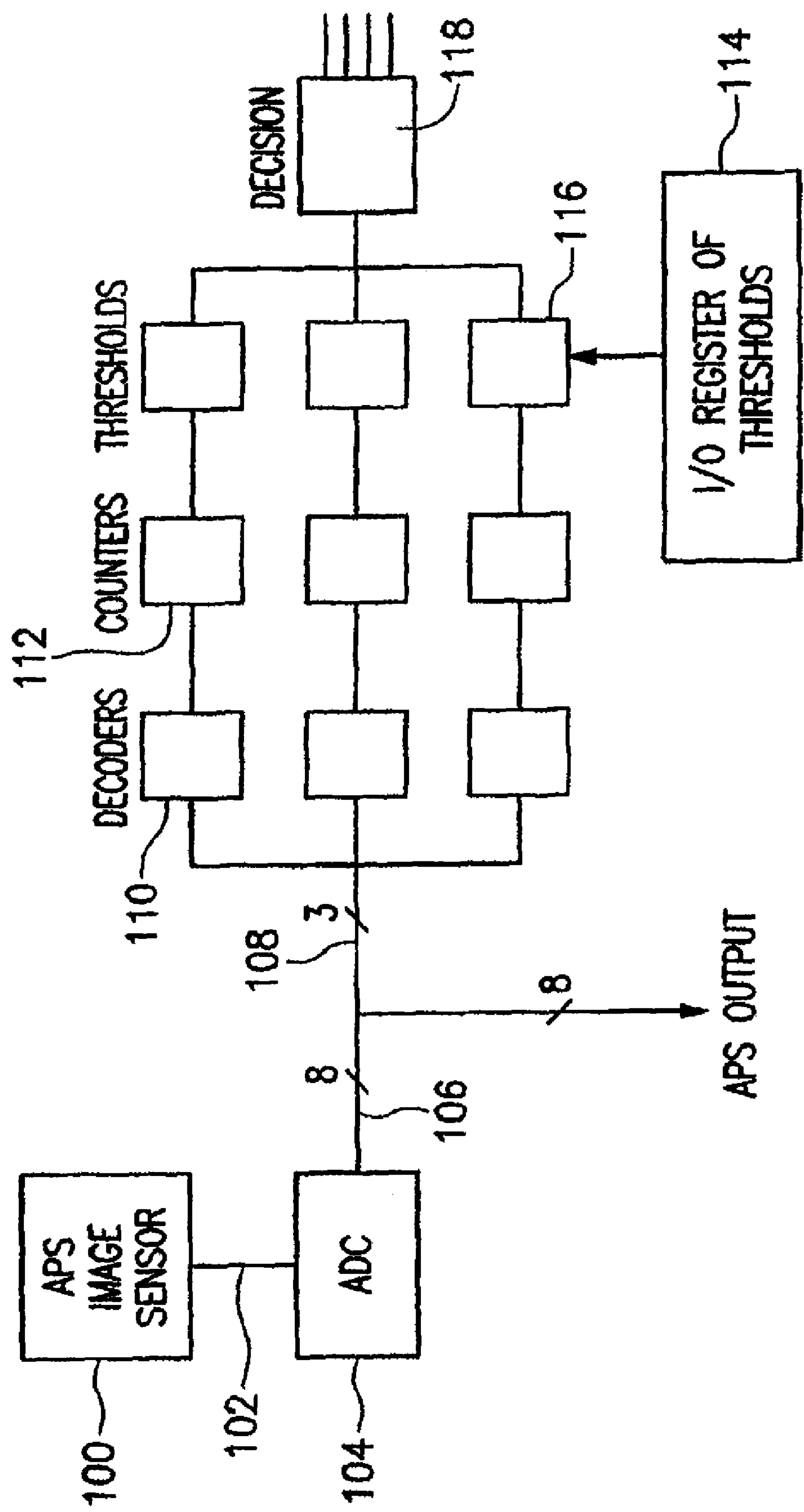
FIG. 1 shows a basic block diagram.

The present system provides a programmable threshold indicator based on measurements of various portions of the image. A block diagram of the system is shown in FIG. 1.

Active pixel image sensor 100 includes an array of units, e.g., rows and columns, of CMOS active pixels. Each preferably includes an in-pixel buffer transistor configured as a source follower, and an in-pixel row or column select transistor. The output of the sensor can be provided either single pixel at a time, or as a parallel group of pixel units 102 to the analog-to-digital converter 104. ADC 104 preferably produces an 8-bit output 106. The two to three most-significant bits of the analog-to-digital converter are usually enough to analyze intensity distribution.

The three most-significant bits 108 are coupled to pixel characterization elements 110. These detect whether the states of the three bit output 108 have a specified characteristics. When the states have the specified characteristics, the decoder produces an output. Counters 112 count the output, effectively counting the number of times that the bits are coincident with the values. Therefore, the counters 112 keep a count, for each frame, of the number of samples which have specified values.

A number of thresholds are maintained by I/O register 114. Comparing elements 116 compare the counter outputs with the thresholds from the interface register. If one or more of these thresholds are exceeded, then decision block 118 produces a command to either increment or decrement the exposure: e.g., the shutter width or gain of image acquisition. This can be done frame by frame, or for a group of frames.

A first embodiment uses a two-threshold simple-scheme. This takes into account only the two most-significant bits. In this scheme, the relative number of data whose MsBs are "11" are counted. The number of data in the lower half segment of the data scale (e.g. the most significant bit [MSB] is equal to 0) is also counted. The data "11" is considered as being close to saturation. An exemplary threshold for the amount of that data can be thirty percent. Similarly, the tolerance for "dark" data, in which the MSB is zero, is restricted to be 75%. Step 202 detects if the first threshold in which both major bits are "11" for more than thirty percent of the data. This is taken as an overexposed condition at 204 and the integration time or gain is lowered. The second threshold is investigated at 210. If five percent of the data is dark (MSB is 0), the data is taken as underexposed data and the integration time or gain is increased.

The thresholds must be selected with an amount of hysteresis which is effective to avoid oscillations when the image has many contrasts i.e. between black and white. For example, the sum of the two percentages should exceed 100 percent.

Figure 3:
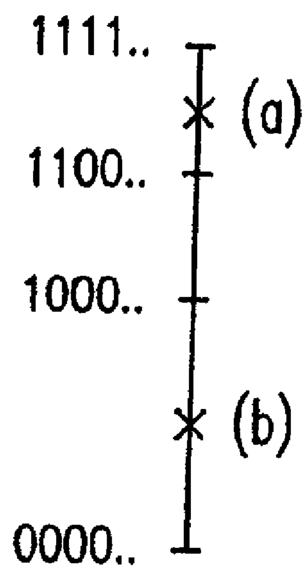
FIG. 3 shows a point diagram of the FIG. 2 embodiment.

FIG. 3 shows a bar graph with the overexposure/underexposure parameters. The point A in FIG. 3 is at an overexposed position. If more than 30 percent of the image is in this position, then the image is taken to be overexposed and the gain or integration time is lowered. Conversely, point B is in an underexposed position. If more than 75 percent of the image is in this position, then the image is taken to be underexposed.

Figure 2:
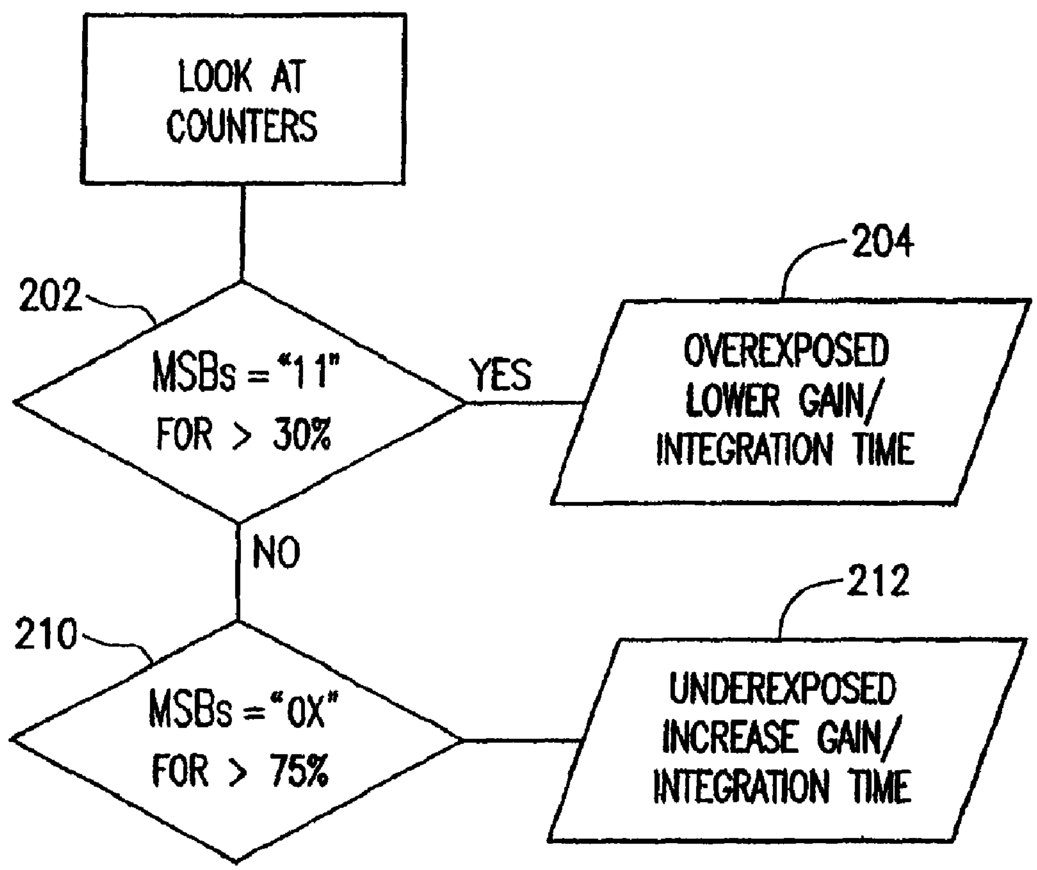
FIG. 2 shows a flowchart of operation of a two-threshold embodiment.
Figure 4:
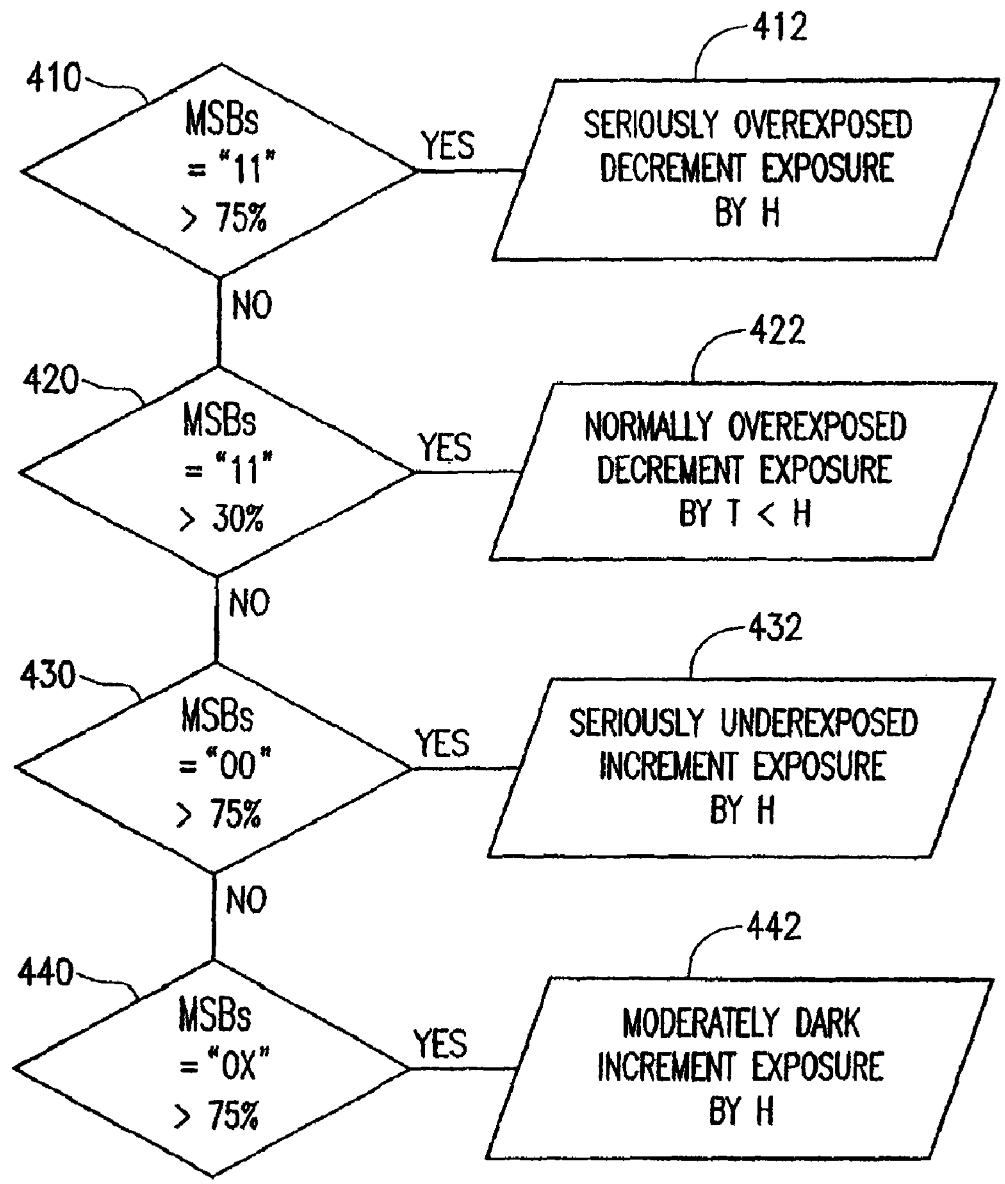
FIG. 4 shows a flowchart of a second, three-threshold embodiment.

A second embodiment which operates according to the flowchart of FIG. 4 uses a three threshold advance scheme. This takes only the two highest bits at the input to the indicator, as in the first system. However, this scheme uses three decoders and three counters as shown in FIG. 1. This system counts: (a) the number of samples in which the upper bits are "11"; (b) the number of samples in which the most significant bit is "0"; and (c) the number of samples in which the upper bits are both "00". This provides more information about the image than the FIG. 2 system. This also enables adjusting the exposure/gain in two steps.

FIG. 4 shows a flowchart of the second embodiment. At step 410, the decision making process determines if the relative number of samples determined by a, in which both MsBs are "11" is more than 75 percent. If so, then the image is considered to be grossly overexposed. At step 406, the exposure/gain is decremented by a higher value H.

If the result of step 410 is No, step 420 tests if the relative number of samples is more than 30 percent. If so, the image is considered as being normally overexposed at 422. A tuning decrement T is applied at step 422 where T less than H.

If the relative number of sample c, the very dark pixels, is more than 75 percent at step 430, then the image is considered as seriously underexposed. In this case, the exposure/gain is incremented by the higher value H at step 432.

Finally, if none of the other steps are true, the relative number of samples b, that is moderately dark pixels that are not very dark, are tested at 440. If this value is more than 75 percent detected at step 416, then the image is considered as moderately dark at 442. A tuning increment T is added to the exposure or gain.

This can be carried out on a frame by frame basis. These thresholds can also be programmable, to allow more bright or dark scenes. The programmable thresholds can be made by user manual intervention, or by an automatic intervention from the computer system.

Figure 5:
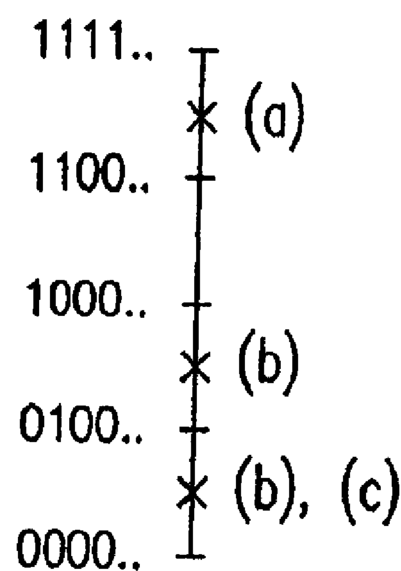
FIG. 5 shows a point chart.

FIG. 5 shows a bar chart showing the placement of the pixels within groups a, b, or c, similar to that in FIG. 3.

Figure 6:
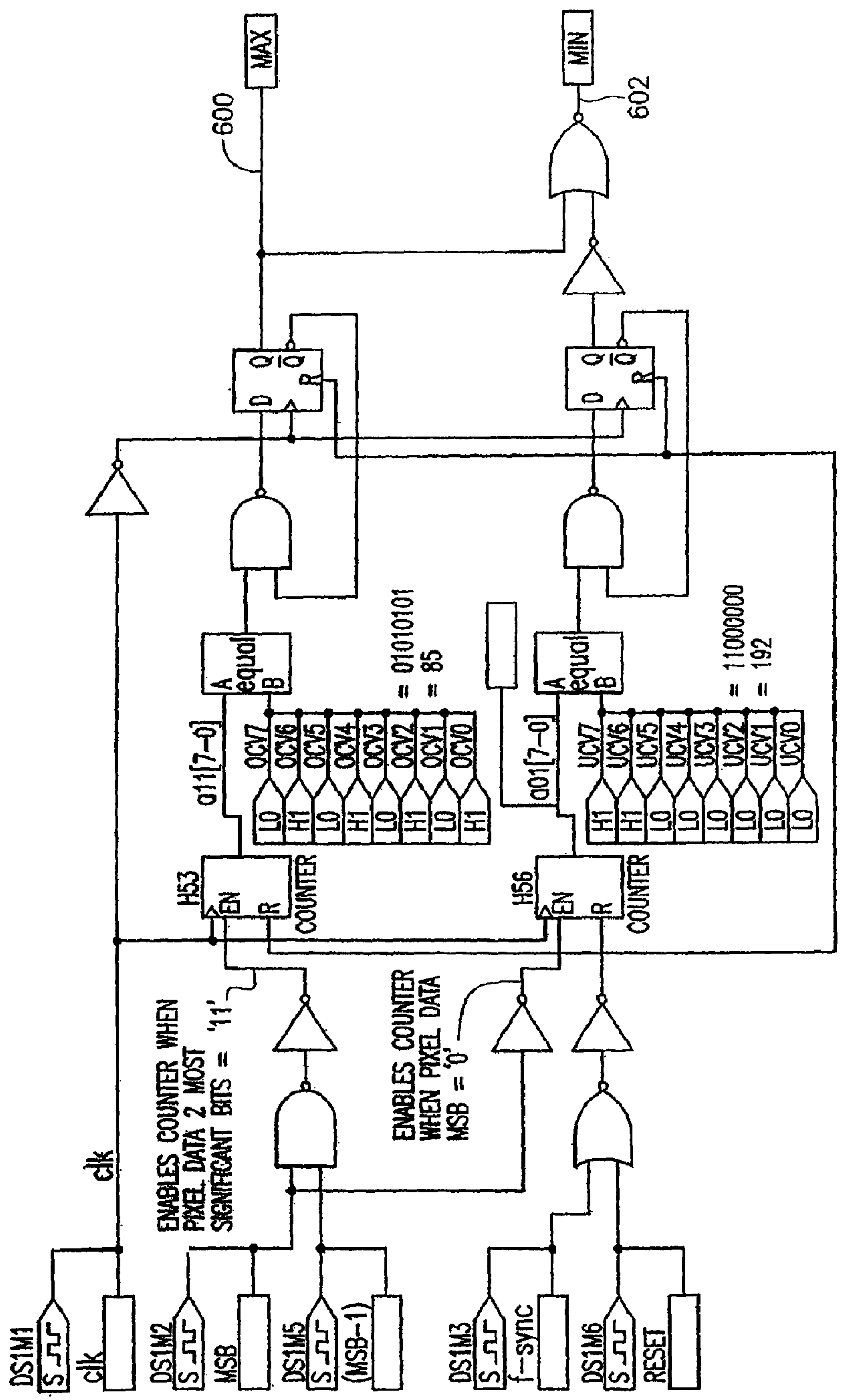
FIG. 6 shows exemplary circuitry for carrying out this embodiment.

An example circuitry is shown in FIG. 6. It should be understood that this circuitry is exemplary only, and that other similar circuits could be easily formed using either a processor or hard wire gates using hardware definition language. Of course, this operation could also be carried out using a programmed processor.

Figure 7:
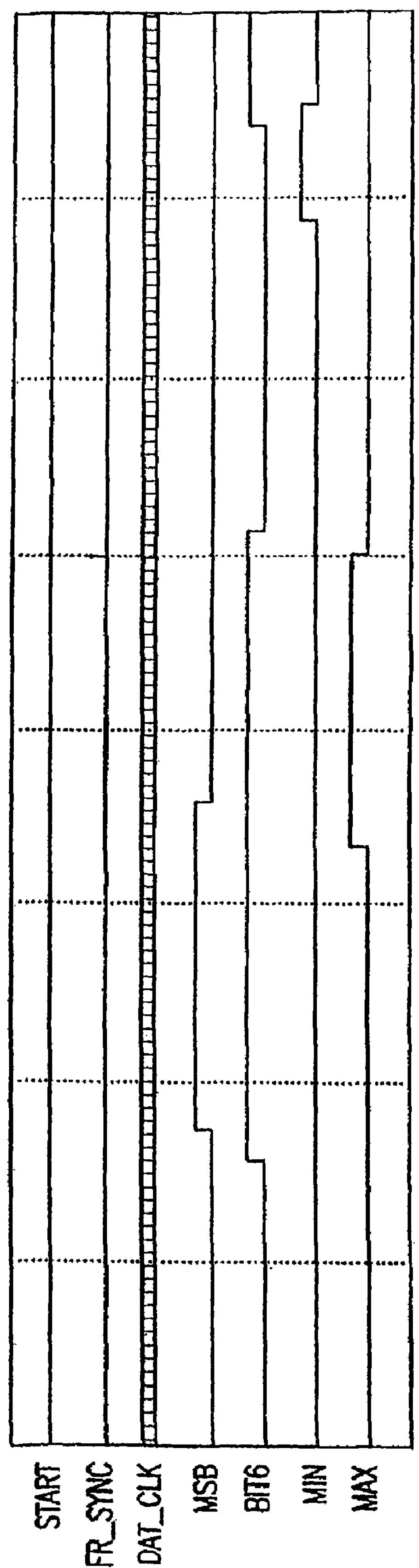
FIG. 7 shows results of simulation.

FIG. 7 shows results of a simulation using a simple test. The circuit signals maxed during the second frame as the number of 11 sample has exceeded 30 percent and min in the third frame as after two 00 counts has approached 75 percent of the total samples.

Although only a few embodiments have been disclosed above, other modifications are within the disclosed features.

For example, the system as described could be carried out using a processor or a digital signal processor. Preferably, however, all of the subjects in FIG. 1 are carried out on the same substrate.

What is claimed is:

1. A device comprising:
- a first counter which counts a number of digital values indicating an overexposed pixel output during at least one image frame;
- a second counter which counts a number of digital values indicating an underexposed pixel output during said at least one image frame;
- at least one comparator for comparing results of said first and second counters with programmable thresholds; and
- a decision element for making a decision to either increase, decrease, or maintain an exposure of a next frame of said image sensor based on comparison results from the at least one comparator.

2. A device as in claim 1, further comprising first and second characterization elements configured to review only a predetermined number of most significant bits of each of said digital values and provide a signal to a respective one of said first and second counters according to said most significant bits.

3. A device as in claim 1, wherein said comparator is configured to compare said results of said first and second counters with desired thresholds.

4. A device as in claim 3, wherein said desired thresholds include a first value indicative of what percentage of said plurality of digital outputs can indicate overexposure and a second value indicative of what percentage of said plurality of digital outputs can indicate underexposure for said at least one image frame.

5. A device as in claim 4, wherein said decision element is configured to decrease said exposure of said next frame if said result of said first counter exceeds said first value, and to increase said exposure of said next frame if said result of said second counter exceeds said second value.

6. A device as in claim 3, wherein said desired thresholds include a first value indicative of what number of said plurality of digital outputs can indicate overexposure and a second value indicative of what number of said plurality of digital outputs can indicate underexposure for said at least one image frame.

7. A device as in claim 6, wherein said decision element is configured to decrease said exposure of said next frame if said result of said first counter exceeds said first value, and to increase said exposure of said next frame if said result of said second counter exceeds said second value.

8. A device as in claim 1, wherein said comparator is configured to compare a percentage of said digital values indicating an overexposed pixel output and a percentage of said digital values indicating an underexposed pixel output.

9. A device as in claim 1, wherein said decision element is configured to increase or decrease said exposure by adjusting at least one of:
- a shutter width of said image sensor; and
- a gain of said image sensor.

10. A method of controlling exposure comprising:
- obtaining a plurality of digital values from a current image frame representing values of pixels of an image sensor;
- reviewing said plurality of digital values to determine if each digital value in said plurality of digital values indicates an overexposed pixel or an underexposed pixel;
- comparing results of said determination with programmable thresholds; and
- adjusting exposure of a next frame of said image sensor according to said comparison.

11. A method as in claim 10, said step of reviewing further comprising reviewing only a predetermined number of most significant bits of each of said digital values.

12. A method as in claim 10, said step of comparing results of said determination further comprising:
- comparing a count of said digital values in said plurality of digital values indicating an overexposure with a first desired threshold; and
- comparing a count of said digital values in said plurality of digital values indicating an underexposure with a second desired threshold.

13. A method as in claim 12, said step of adjusting exposure of said subsequent frame further comprising:
- decreasing exposure of said next frame if said count of said digital values in said plurality of digital values indicating an overexposure exceeds said first threshold; and increasing exposure of said next frame if said count of said digital values in said plurality of digital values indicating an underexposure exceeds said second threshold.

14. A method as in claim 10, said step of comparing results of said determination further comprising:

comparing a percentage of said digital values in said plurality of digital values indicating an overexposure with a first desired threshold; and comparing a percentage of said digital values in said plurality of digital values indicating an underexposure with a second desired threshold.

15. A method as in claim 14, said step of adjusting exposure of said subsequent frame further comprising:

decreasing exposure of said next frame if said percentage of said digital values in said plurality of digital values indicating an overexposure exceeds said first threshold; and increasing exposure of said next frame if said percentage of said digital values in said plurality of digital values indicating an underexposure exceeds said second threshold.

16. A method as in claim 10, said step of adjusting exposure of said next frame comprising adjusting at least one of:

a shutter width of said image sensor; and a gain of said image sensor.

* * * * *